US009959979B2

(12) United States Patent
Hahn et al.

(10) Patent No.: US 9,959,979 B2
(45) Date of Patent: May 1, 2018

(54) LOW ESR CAPACITOR

(71) Applicant: KEMET Electronics Corporation, Simpsonville, SC (US)

(72) Inventors: Randolph S. Hahn, Simpsonville, SC (US); Jeffrey Poltorak, Simpsonville, SC (US); Brandon Summey, Simpsonville, SC (US); Antony P. Chacko, Simpsonville, SC (US); John T. Kinard, Simpsonville, SC (US); Philip M. Lessner, Simpsonville, SC (US)

(73) Assignee: KEMET Electronics Corporation, Simpsonville, SC (US)

( * ) Notice: Subject to any disclaimer, the term of this patent is extended or adjusted under 35 U.S.C. 154(b) by 419 days.

(21) Appl. No.: 14/183,633

(22) Filed: Feb. 19, 2014

(65) Prior Publication Data
US 2014/0233157 A1 Aug. 21, 2014

Related U.S. Application Data

(60) Provisional application No. 61/766,454, filed on Feb. 19, 2013.

(51) Int. Cl.
*H01G 9/052* (2006.01)
*H01G 9/025* (2006.01)
*H01G 9/15* (2006.01)
*H01G 9/042* (2006.01)
*H01G 9/048* (2006.01)
*H01G 9/00* (2006.01)

(52) U.S. Cl.
CPC ............... *H01G 9/15* (2013.01); *H01G 9/048* (2013.01); *H01G 9/0425* (2013.01); *H01G 9/0036* (2013.01)

(58) Field of Classification Search
CPC ................................ H01G 9/048; H01G 9/052
USPC ........................................................ 361/528
See application file for complete search history.

(56) References Cited

U.S. PATENT DOCUMENTS

| | | |
|---|---|---|
| 3,345,545 A | 11/1964 | Bourgault et al. |
| 4,794,491 A | 12/1988 | Saiki |
| 4,812,951 A | 3/1989 | Melody et al. |
| 5,185,075 A | 2/1993 | Rosenberg et al. |
| 5,716,511 A | 2/1998 | Melody et al. |

(Continued)

FOREIGN PATENT DOCUMENTS

| | | |
|---|---|---|
| CN | 101663719 | 3/2010 |
| GB | 2168383 | 6/1986 |

(Continued)

OTHER PUBLICATIONS

ISA/KR; International Search Report and Written Opinion of the International Searching Authority; PCT/US2014/017027; Applicant: Kemet Electronics Corporation; dated May 26, 2014.

(Continued)

*Primary Examiner* — Eric Thomas
(74) *Attorney, Agent, or Firm* — Joseph T. Guy; Patent Filing Specialist, Inc.

(57) ABSTRACT

An improved capacitor is provided wherein the improved capacitor has improved ESR. The capacitor has a fluted anode and an anode wire extending from the fluted anode. A dielectric is on the fluted anode. A conformal cathode is on the dielectric and a plated metal layer is on the carbon layer.

58 Claims, 2 Drawing Sheets

(56) References Cited

U.S. PATENT DOCUMENTS

| | | | |
|---|---|---|---|
| 5,754,394 A | 5/1998 | Evans | |
| 5,949,639 A | 9/1999 | Maeda et al. | |
| 6,168,639 B1* | 1/2001 | Taketani | H01G 9/0036 |
| | | | 205/80 |
| 6,191,936 B1 | 2/2001 | Webber et al. | |
| 6,480,371 B1 | 11/2002 | Kinard et al. | |
| 6,798,644 B1 | 9/2004 | Piller et al. | |
| 7,116,548 B2 | 10/2006 | Satterfield, Jr. et al. | |
| 7,154,742 B1 | 12/2006 | Hahn et al. | |
| 7,342,775 B2 | 3/2008 | Hahn et al. | |
| 8,259,436 B2 | 9/2012 | Petrzilek et al. | |
| 8,310,816 B2 | 11/2012 | Chacko | |
| 8,503,165 B2 | 8/2013 | Chacko et al. | |
| 2004/0231119 A1 | 11/2004 | Brenneman et al. | |
| 2007/0045696 A1* | 3/2007 | Iida | H01G 9/0032 |
| | | | 257/296 |
| 2008/0254269 A1 | 10/2008 | Freeman et al. | |
| 2008/0299335 A1* | 12/2008 | Poltorak | H01G 9/0029 |
| | | | 428/34.1 |
| 2011/0090621 A1* | 4/2011 | Chacko | H01G 9/012 |
| | | | 361/523 |
| 2012/0069493 A1 | 3/2012 | Poltorak et al. | |
| 2012/0147528 A1* | 6/2012 | Biler | H01G 9/025 |
| | | | 361/525 |
| 2012/0257328 A1* | 10/2012 | Zednicek | H01G 9/012 |
| | | | 361/528 |

FOREIGN PATENT DOCUMENTS

| | | | |
|---|---|---|---|
| JP | H02 178912 | 7/1990 | |
| JP | 05-090094 | 4/1993 | |
| JP | 2 811915 | 10/1998 | |
| JP | 3104246 | 10/2000 | |
| JP | 2001-217160 | 8/2001 | |
| JP | 2006120982 A | * | 5/2006 |
| WO | WO 2007-130234 | 11/2007 | |
| WO | WO 2008-036909 | 3/2008 | |
| WO | WO 2012/040292 | 3/2012 | |

OTHER PUBLICATIONS

ISA/KR; International Search Report and Written Opinion of the International Searching Authority; PCT/US2014/017114; Applicant: Kemet Electronics Corporation; dated May 26, 2014.

* cited by examiner

LOW ESR CAPACITOR

CROSS-REFERENCE TO RELATED APPLICATIONS

The present invention claims priority to U.S. Provisional Appl. No. 61/766,454 filed Feb. 19, 2013 which is incorporated herein by reference.

BACKGROUND

The present invention is related to an improved method for preparing solid electrolytic capacitors. More specifically, the present invention is related to an improved method of forming a solid electrolyte capacitor and an improved capacitor formed thereby. Even more specifically, the present invention is related to an improved conformal cathode formed by improved polymerization method and improved metal plating methods particularly for fluted anodes.

The construction and manufacture of solid electrolyte capacitors is well documented. In the construction of a solid electrolytic capacitor a valve metal preferably serves as the anode. The anode body can be either a porous pellet, formed by pressing and sintering a high purity powder, or a foil which is etched to provide an increased anode surface area. An oxide of the valve metal is electrolytically formed to cover up to all of the surfaces of the anode and to serve as the dielectric of the capacitor. The solid cathode electrolyte is typically chosen from a very limited class of materials, to include manganese dioxide or electrically conductive organic materials such as 7,7,8,8 tetracyanoquinonedimethane (TCNQ) complex salt, or intrinsically conductive polymers, such as polyaniline, polypyrol, polythiophene and their derivatives. The solid cathode electrolyte is applied so that it covers all dielectric surfaces and is in direct intimate contact with the dielectric. In addition to the solid electrolyte, the cathodic layer of a solid electrolyte capacitor typically consists of several layers which are external to the anode body. In the case of surface mount constructions these layers typically include: a carbon layer; a cathode conductive layer which may be a layer containing a highly conductive metal, typically silver, bound in a polymer or resin matrix; and a conductive adhesive layer such as silver filled adhesive. The layers including the solid cathode electrolyte, conductive adhesive and layers there between are referred to collectively herein as the cathode layer which typically includes multiple interlayers designed to allow adhesion on one face to the dielectric and on the other face to the cathode lead. A highly conductive metal lead frame is often used as a cathode lead for negative termination. The various layers connect the solid electrolyte to the outside circuit and also serve to protect the dielectric from thermo-mechanical damage that may occur during subsequent processing, board mounting, or customer use.

Leading edge designs for portable electronic devices require capacitors which deliver volumetric efficiency, high reliability, low cost, reduced propensity for ignition, and low Equivalent Series Resistance (ESR). Tantalum capacitors employing a conductive polymer cathode are uniquely capable of providing all of these critical characteristics. Tantalum capacitors have a long track record for unsurpassed volumetric efficiency and reliability. The introduction of conductive polymer cathodes enabled dramatic reductions in ESR and has greatly increased resistance to ignition relative to $MnO_2$. The lower ESR and enhanced cap retention at high frequency of the conductive polymer construction enables circuit designers to reduce the number of capacitors required to achieve design solutions resulting in reduced cost.

U.S. Pat. No. 7,154,742, which is incorporated by reference, describes the use of capacitive elements with very narrow flutes to improve capacitance recovery. As illustrated in FIGS. 5-8 of the '742 patent the use of flutes is considered in the art to be suitable for a limited range of flute size. U.S. Pat. Nos. 7,342,775 and 7,116,548, which are incorporated herein by reference, improve on the fluted capacitor by incorporating multiple lead wires and a conductive polymer cathode system yet the flute size is still somewhat limited and the full potential expected with the flutes is still not realized. While not limited to any theory it has now been realized that the limitation of flute sizes results from the inability of the cathode layers to conform to the flute dimensions. As illustrated in FIG. 2 of U.S. Pat. No. 7,342,775, the cathode layers tend to pool in the flute and therefore the thickness of cathode is inconsistent thereby limiting the advantages provided by the flutes. This problem, now realized, was considered unavoidable since the methods available for forming the cathode layer did not lend themselves to conformal coatings and the full advantages available with fluted anodes was considered to have been achieved.

The present invention provides an improved capacitor wherein additional advantages, beyond those thought achievable, from a fluted anode can be achieved.

SUMMARY OF THE INVENTION

It is an object of the invention to provide an improved solid electrolytic capacitor.

It is an object of the invention to provide an improved method of preparing a solid electrolytic capacitor cathode and an improved solid electrolytic capacitor formed thereby.

A particular advantage is a capacitor with an improved ESR.

These and other advantages, as will be realized, are provided in an improved capacitor. The capacitor has a fluted anode and an anode wire extending from the fluted anode. A dielectric is on the fluted anode. A conformal cathode is on the dielectric and a plated metal layer is on the carbon layer.

Yet another embodiment is provided in an improved capacitor. The capacitor has an anode and an anode wire extending from the anode. A dielectric is on the anode. A conformal cathode is on the dielectric and a plated metal layer is on the carbon layer.

Yet another embodiment is provided in a method for forming a capacitor. The method includes:
anodizing an anode to form a dielectric on the anode wherein the anode comprises flutes and an anode wire extending therefrom;
forming a conductive node on the anode wire;
forming a first conductive layer on the dielectric wherein the first conductive layer and the conductive node are in electrical contact with the anode wire;
applying voltage to the anode wire; electrochemically depositing conductive polymer on the first conductive layer to form conformal cathode; and
forming a metal layer in electrical contact with the conformal cathode.

FIGURES

DISCUSSION

The instant invention is directed to a method of making a solid electrolytic capacitor and an improved solid electrolytic capacitor made by the method. More specifically, the present invention is directed to a capacitor comprising a fluted anode with a conformal cathode. The conformal cathode is provided by an electrochemical polymerization method utilizing conductive nodes to provide a preferential conductive path which bypasses voltage application through the dielectric.

The invention will be described with reference to the various figures forming an integral non-limiting component of the disclosure. Throughout the disclosure similar elements will be numbered accordingly.

Figure 1:
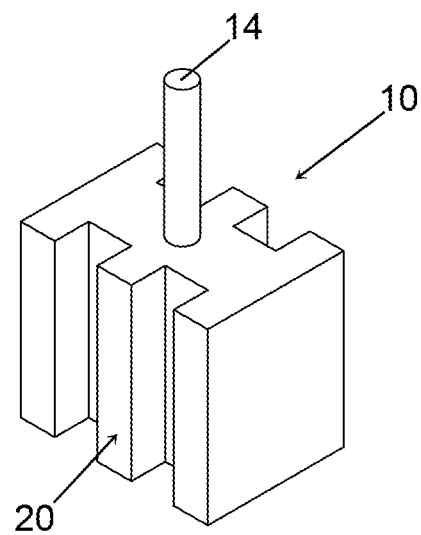
FIG. 1 is a schematic perspective view of an embodiment of the invention.
Figure 2:
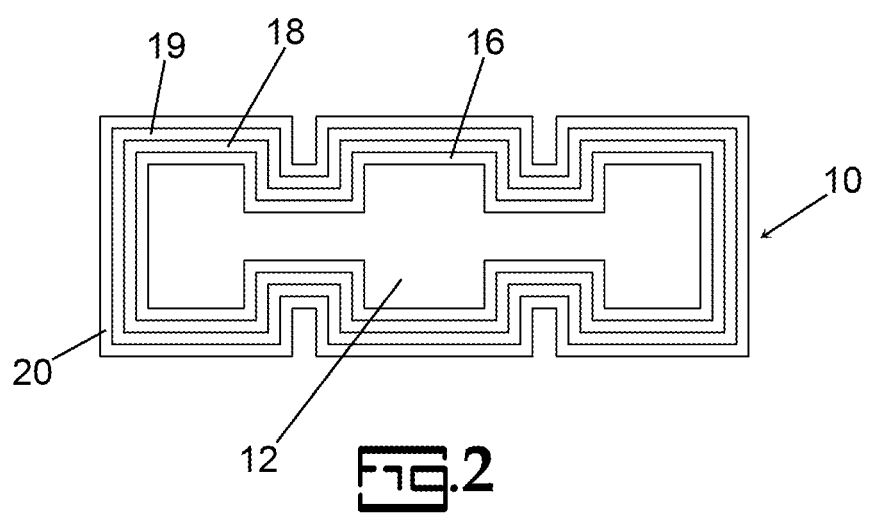
FIG. 2 is a schematic cross-sectional view of an embodiment of the invention.

An embodiment of the invention is illustrated in perspective schematic side view in FIG. 1 and in cross-sectional schematic view in FIG. 2. In FIGS. 1 and 2, a capacitor, generally represented at 10, comprises an anode, 12, with an anode lead wire, 14, extending therefrom or attached thereto. A dielectric, 16, is formed on the anode and preferably the dielectric encases at least a portion, and preferably the entire, anode and a portion of the anode lead. A conformal cathode, 18, is on the dielectric and encases a portion of the dielectric with the proviso that the cathode and anode are not in direct electrical contact. A conformal cathode is defined herein as a conductive layer conforming to the shape of the anode, preferably comprising a conductive polymer, and preferably a fluted anode, wherein the conformal cathode has an average thickness of at least 1 micron and more preferably at least 2 microns to no more than 40 microns, preferably no more than 20 microns and more preferably no more than 10 microns with a deviation in thickness of no more than 50%, preferably no more than 40%, more preferably no more than 30%, even more preferably no more than 20% and even more preferably no more than 10% of the average thickness.

It is known in the art that adhering a lead to a polymeric layer is difficult and it is therefore desirable to form at least one adhesion layer on the conformal cathode which is more easily attached to a metallic lead frame. Carbon containing layers and metal layers are known in the art. In a particularly preferred embodiment the adhesion layers comprise a layer containing carbon, 19, with a plated metal layer, 20, thereon wherein the plated metal layer is preferably formed by electro-deposition as more specifically set forth herein. The capacitor of FIGS. 1 and 2 is then incorporated into a package include anode and cathode terminations and an optional encasement as known in the art.

Figure 3:
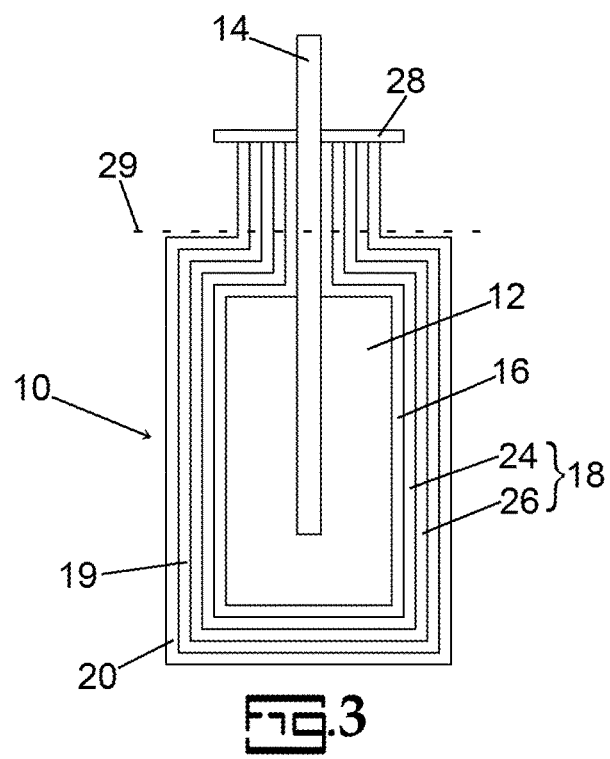
FIG. 3 is a schematic cross-sectional view of an embodiment of the invention.

An embodiment of the invention is illustrated in partial cross-sectional schematic view in FIG. 3. In FIG. 3, the anode, 12, and anode lead, 14, are as illustrated in and described relative to FIG. 2. A conductive node, 28, is in electrical contact with the anode lead, 14, preferably away from the anode body as will be more clearly set forth herein. The conductive node provides a preferred conductive path due to a resistance which is lower than the resistance of the current path through the dielectric, 16. A first conductive layer, 24, is applied to the surface of the dielectric and in contact with the conductive node. The first conductive layer is preferably a manganese dioxide layer or a conductive polymer layer with preference for a conductive polymer layer and particular preference for the same conductive polymer composition as subsequently formed polymer layers as will be further discussed.

In a preferred embodiment the first conductive layer is a conductive polymer formed by initially dipping the anode into an oxidizer, such as iron (III) toluenesulfonate followed by dipping into a monomer or monomer solution, such as ethylenedioxythiophene, for a short time. The first conductive layer is intended to be a very thin layer which is insufficient for functioning as the cathode yet sufficient to form electrical contact with the conductive node. After the first conductive layer is formed the cathode is built up in thickness by electrochemical deposition of polymer from a monomer. Voltage is applied to the anode lead, 14, wherein the current passes through the conductive node, 28, which is in electrical contact with the first conductive layer, 24, thereby facilitating polymer growth, to form a conductive polymer layer, 26. The first conductive layer and conductive polymer layer are taken together to form the conformal cathode, 18, which has a consistent thickness over the whole of the dielectric.

The first conductive layer and conductive polymer layer can each be applied in a single step or in multiple steps. For example, the first conductive layer may be formed in a single dip of oxidizer followed by a single dip in monomer or multiple alternating dips of oxidizer and monomer. The electrochemical layer, formed by electrochemical deposition, is preferably formed in a single step.

With further reference to FIG. 3, after formation of the conformal cathode, 18, the adhesion layers are formed on the surface of the conformal cathode to facilitate adhesion to a cathode lead frame. A carbon layer, 19, is formed preferably by dipping in a solution containing conductive carbon and a binder. Carbon containing solutions can be prepared with viscosities suitable for forming a coating which conforms adequately to the conformal cathode as known in the art. Carbon coatings are well known in the art and not particularly limited herein. A plated metal layer, 20, is formed on the carbon layer. In a particularly preferred embodiment the plated metal layer is formed by electrical deposition of metal with current provided to the anode wire and passing through the node and conformal cathode and carbon layer thereby forming a plated metal layer on the carbon. The metal is preferably selected from copper, nickel, silver and gold with copper being particularly preferred.

Figure 4:
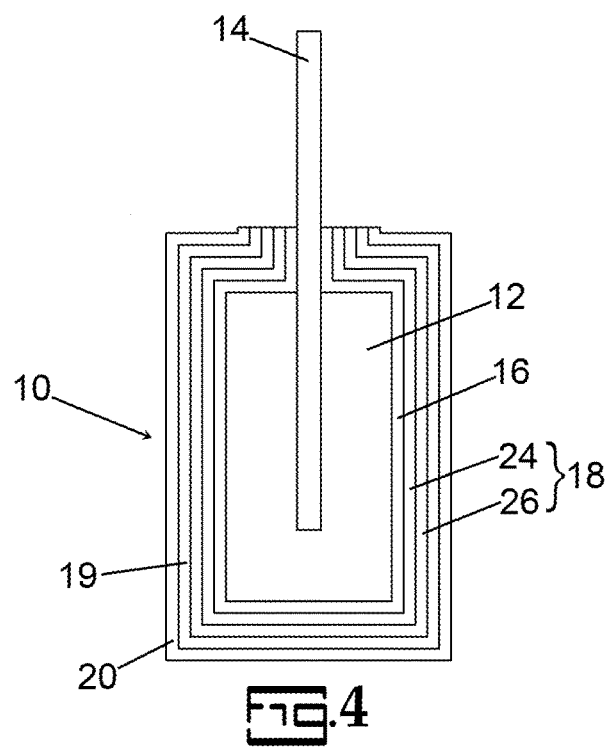
FIG. 4 is a schematic cross-sectional view of an embodiment of the invention.

After formation of the metal plating the electrical conductivity of the anode wire and cathode layers, represented by the layers applied over the dielectric, is disrupted by laser ablation, such as at line 26, thereby electrically isolating the anode elements, the anode and anode wire, from the cathode layers thereby resulting in the capacitor illustrated in FIG. 4 in cross-sectional schematic view. The capacitor is then terminated as known in the art and optionally encapsulated as known in the art.

The basic components of a capacitor are an anode, a cathode and a dielectric between the two electrodes. In a typical solid electrolytic capacitor the anode is a porous valve metal pellet or foil with the valve metal preferably selected from tantalum, aluminum, niobium, or niobium oxide. The dielectric is preferably a highly insulative oxide of the valve metal which covers internal and external surfaces of the porous anode. An anode lead wire is typically embedded in the anode or attached to the anode to serve as an electrical connection to an anode termination. The cathode typically comprises multiple layers. The cathode typically covers the internal and external surfaces of the dielectric. In order to produce reliable solid electrolytic capacitors, the cathode layer preferably exhibits healing properties which allow defect sites in the dielectric to be healed. The mechanisms responsible for healing are generally believed to be due to decreases in conductivity of the cathode in the area of a dielectric flaw site that occurs as a result of Joule heating as current flows through the flaw site. This greatly restricts the choice of materials utilized as the primary cathode layer. MnO$_2$ and intrinsically conductive polymers (ICP) are used most frequently. ICP's exhibit much higher conductivity and a benign failure rate compared to MnO$_2$. However, capacitors manufactured with MnO$_2$ tend to have lower manufacturing costs, lower leakage and improved reliability in harsh environments. In order to reduce the ESR of the device an external metallized layer is employed. The metallized layer is generally incompatible with the primary cathode layer, thus a chemical isolation layer is applied between the primary cathode layer and the metallized layer. A carbon filled layer is most commonly used as an isolation layer. Additional isolation layers may be employed to improve moisture resistance or provide further protection to prevent materials which do not exhibit healing characteristics from contacting the dielectric.

An important trend in the capacitor industry is the need to manufacture products with ever decreasing ESR values that function at ever increasing frequency. In order to achieve the low ESR levels required in today's circuits, solid electrolytic capacitor manufacturers typically employ ICP's as the primary cathode layer. In order to further reduce ESR capacitor manufacturers have developed designs such as multiple anode tantalum capacitors, stacked aluminum capacitors, and fluted anodes.

The number of flutes and the depth of the flutes are preferably maximized to achieve minimum ESR. Maximizing the number of flutes requires reducing the width of the flute. Thus the minimum ESR is obtained with flutes where the depth of the flute exceeds the width of the flute.

Multiple lead wires can be incorporated however, they are more difficult to attach to the anode termination and thus are less desirable. The shape of the lead wire is not particularly limited herein with rounded or flat, rectangular, wires being suitable for a demonstration of the invention. With flat wires it is preferable that the flat wire extends at least to the midpoint of outside flutes otherwise the ESR can be negatively impacted.

The flutes are preferably no more than 0.022 inches (0.55 mm) wide at the widest point. With conformal cathodes very narrow flutes, such as 0.004 inches (0.10 mm) can be used. Even more preferably the flutes have a width of no more than 0.019 inches (0.48 mm) and most preferably no more than 0.016 inches (0.41 mm) in width at the widest point. Preferably, the flute depth exceeds the flute width with the depth to width ratio preferably being at least 0.6 to 1. It is preferable that the anode have least 2 flutes, preferably at least 4 flutes, and most preferably at least 6 flutes. The capacitor uses a flat wire or multiple lead wires.

In order to minimize the ESR it is preferable that the ratio of the surface area in the flutes or dimples of the metallized layer-adjacent cathode layer interface to the external anode surface-primary cathode layer interface is greater than 75%, more preferably greater that 85%, and most preferably greater than 95%.

Although the use of multiple capacitors in a common case effectively reduce the ESR of the device the cost of assembling multiple capacitive elements in a single package increases the cost of the device, as well as the cost of the equipment needed to manufacture the capacitor.

The cathode layer is a conductive layer preferably comprising conductive polymer, such as polythiophene, polyaniline, polypyrrole or their derivatives, manganese dioxide, lead oxide or combinations thereof. An intrinsically conducting polymer is most preferred.

A particularly preferred conducting polymer is illustrated in Formula I:

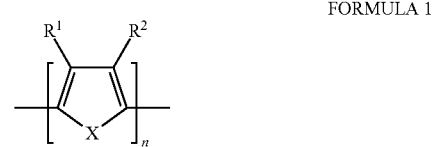

FORMULA 1

Wherein $R^1$ and $R^2$ are chosen to prohibit polymerization at the β-site of the ring. It is most preferred that only α-site polymerization be allowed to proceed. Therefore, it is preferred that $R^1$ and $R^2$ are not hydrogen. More preferably, $R^1$ and $R^2$ are α-directors. Therefore, ether linkages are preferable over alkyl linkages. It is most preferred that the groups be small to avoid steric interferences. For these reasons $R^1$ and $R^2$ taken together as —O—(CH$_2$)$_2$—O— is most preferred. In Formula 1, X is S or N and most preferable X is S.

$R^1$ and $R^2$ independently represent linear or branched C1-C16 alkyl or C2-C18 alkoxyalkyl; or are C3-C8 cycloalkyl, phenyl or benzyl which are unsubstituted or substituted by C1-C6 alkyl, C1-C6 alkoxy, halogen or OR3; or R1 and R2, taken together, are linear C1-C6 alkylene which is unsubstituted or substituted by C1-C6 alkyl, C1-C6 alkoxy, halogen, C3-C8 cycloalkyl, phenyl, benzyl, C1-C4 alkylphenyl, C1-C4 alkoxyphenyl, halophenyl, C1-C4 alkylbenzyl, C1-C4 alkoxybenzyl or halobenzyl, 5-, 6-, or 7-membered heterocyclic structure containing two oxygen elements. R3 preferably represents hydrogen, linear or branched C1-C16 alkyl or C2-C18 alkoxyalkyl; or are C3-C8 cycloalkyl, phenyl or benzyl which are unsubstituted or substituted by C1-C6 alkyl.

The conducting polymer is preferably chosen from polypyrroles, polyanilines, polythiophenes and polymers comprising repeating units of Formula I, particularly in combination with organic sulfonates: A particularly preferred polymer is 3,4-polyethylene dioxythiophene (PEDT).

As typically employed in the art, various dopants can be incorporated into the polymer during the polymerization process. Dopants can be derived from various acids or salts, including aromatic sulfonic acids, aromatic polysulfonic acids, organic sulfonic acids with hydroxy group, organic sulfonic acids with carboxylhydroxyl group, alicyclic sulfonic acids and benzoquinone sulfonic acids, benzene disulfonic acid, sulfosalicylic acid, sulfoisophthalic acid, camphorsulfonic acid, benzoquinone sulfonic acid, dodecylbenzenesulfonic acid, toluenesulfonic acid. Other suitable dopants include sulfoquinone, anthracenemonosulfonic acid, substituted naphthalenemonosulfonic acid, substituted benzenesulfonic acid or heterocyclic sulfonic acids as exemplified in U.S. Pat. No. 6,381,121 which is included herein by reference thereto.

The isolation layer(s), which are typically carbon containing layers, between the conformal cathode and the plated metal layer within the flutes preferably has an average thickness of at least 1 micron to no more than 20 microns and more preferably no more than 10 microns and most preferably no more than 5 microns. The average thickness of the isolation layer is preferably 1-10 microns, more preferably 1-5 microns, and most preferably 1-3 microns.

The external coating of the primary cathode layer is preferably deposited in an electrochemical polymerization method, most preferably an electrochemical polymerization method that utilizes a conductive node between an external electrical connection and an active cathode region on the dielectric of the capacitive element. An external $MnO_2$ coating is preferably deposited utilizing a slurry of $MnO_2$ particles suspended in manganese nitrate, with the preferred median particle size of the $MnO_2$ less than 15 microns, more preferably less than 10 microns, most preferably less than 5 microns.

The metallized layer is preferably a plated metal layer deposited by electroplating or electroless. The plated metal layer may be applied to a previously applied metal filled layer. Plating can be done with various metallic systems. Copper is a preferred metal system. Plating can be done either by electroplating or electroless plating. Electroplating is preferred due to the lower production cycle time. Conductive adhesive is typically used to adhesively attach the metal layer to the lead frame which acts as the cathode lead or to a circuit trace. The thickness of the plated metal layer is preferably at least 2 microns. Below about 2 microns there may not be complete coverage of the capacitor due to surface roughness of the underlying cathode. Once complete coverage is achieved additional plating provides no additional advantages. Preferably the plated metal layer is deposited by electroplating through a conductive node between an external electrical connection and an active cathode region on the dielectric of the capacitive element.

The anode is a conductor preferably selected from a valve metal or a conductive metal oxide. More preferably the anode comprises a valve metal, a mixture, alloy or conductive oxide of a valve metal preferably selected from Al, W, Ta, Nb, Ti, Zr and Hf. Most preferably the anode comprises at least one material selected from the group consisting of Al, Ta, Nb and NbO. Aluminum is typically employed as a foil while tantalum is typically prepared by pressing tantalum powder and sintering to form a compact. For convenience in handling, the valve metal is typically attached to a carrier thereby allowing large numbers of elements to be processed at the same time.

The anode is preferably etched to increase the surface area, particularly, if the anode is a valve metal foil such as aluminum foil. Etching is preferably done by immersing the anode into at least one etching bath. Various etching baths are taught in the art and the method used for etching the anode is not limited herein. The anode wire is preferably attached to the anode, particularly when a compact is employed. The anode wire can be attached by welding or by embedding into the powder prior to pressing. A valve metal is a particularly suitable anode wire and in a preferred embodiment the anode and anode wire are the same material. A dielectric is formed on the surface of the anode. The dielectric is a non-conductive layer and is not particularly limited herein. The dielectric may be a metal oxide or a ceramic material. A particularly preferred dielectric is the oxide of a metal anode due to the simplicity of formation and ease of use. The dielectric layer is preferably an oxide of the valve metal as further described herein. It is most desirable that the dielectric layer be an oxide of the anode. The dielectric is preferably formed by dipping the anode into an electrolyte solution and applying a positive voltage to the anode. Electrolytes for the oxide formation are not particularly limiting herein but exemplary materials can include ethylene glycol; polyethylene glycol dimethyl ether as described in U.S. Pat. No. 5,716,511; alkanolamines and phosphoric acid, as described in U.S. Pat. No. 6,480,371; polar aprotic solvent solutions of phosphoric acid as described in U.K. Pat. No. GB 2,168,383 and U.S. Pat. No. 5,185,075; complexes of polar aprotic solvents with protonated amines as described in U.S. Pat. No. 4,812,951 or the like. Electrolytes for formation of the dielectric on the anode including aqueous solutions of dicarboxylic acids, such as ammonium adipate are also known. Other materials may be incorporated into the dielectric such as phosphates, citrates, etc. to impart thermal stability or chemical or hydration resistance to the dielectric layer.

EXAMPLES

Comparative Example 1

A series of 1000 microfarad, 2.5V, tantalum anodes with dimension (Width×Length×Height) of 0.140 inches (3.56 mm)×0.190 inches (4.838 mm)×0.070 inches (1.78 mm) with flute having a depth of 0.020 inches (0.51 mm) and a width of 0.015 inches (0.38 mm) and four flutes per side were prepared. The tantalum was anodized to form a dielectric on the tantalum anode. The anode thus formed was dipped into a solution of iron (III) toluenesulfonate oxidant for 1 minute and sequentially dipped into ethyldioxythiophene monomer for 1 minute. The anodes were washed to remove excess monomer and by-products of the reactions after the completion of 60 minutes polymerization, which formed a thin interlayer of conductive polyethylene dioxythiophene polymer (PEDOT) on the dielectric of the anodes. This process was repeated 6 times. A conductive node was formed on the wire. An electrochemical polymerization step was applied, which formed an interlayer of conductive polymer (Polypyrrole) on the PEDOT. The anodes were washed to remove excess monomer and by-products of the reaction after the completion of the electrochemical polymerization. A conventional graphite coating was applied followed by a silver coating. The conductive bridge was disrupted by laser ablation. Parts were assembled and the ESR was measured with the results presented in Table 1.

Comparative Example 2

Parts were prepared in the same manner as in comparative Example 1 except the polymer was formed by conventional chemical polymerization. A conventional graphite coating was applied followed by a silver coating. Parts were assembled and the ESR was measured with the results presented in Table 1.

Comparative Example 3

Parts were prepared in the same manner as in comparative Example 2 without the carbon coating. A copper layer was deposited using electroplating. Parts were assembled and the ESR was measured with the results presented in Table 1.

Inventive Example

A series of tantalum anodes were prepared as in Comparative Example 1. The tantalum was anodized to form a dielectric on the tantalum anode. The anode thus formed was dipped into a solution of iron (III) toluenesulfonate oxidant for 1 minute and sequentially dipped into ethyldioxythiophene monomer for 1 minute. The anodes were washed to remove excess monomer and by-products of the reactions after the completion of 60 minutes polymerization, which formed a thin interlayer of PEDOT on the dielectric of the anodes. This process was repeated 6 times. A conductive node was formed on the anode wire in electrical contact with the PEDOT. Electrochemical polymerization was applied to form a conformal cathode. A conventional graphite was applied to the conformal cathode. A copper layer was deposited on the carbon layer by electroplating through the conductive node. The conductive bridge was disrupted by laser ablation. Parts were assembled and the ESR was measured with the results presented in Table 1.

TABLE 1

ESR of comparative and inventive examples

| Examples | Flute | Electrochemical Polymerization | Electroplating (Cu) | ESR (mohm) before molding |
|---|---|---|---|---|
| Comparative Example 1 | Yes | Yes | No | 12.42 |
| Comparative Example 2 | Yes | No | No | 10.83 |
| Comparative Example 3 | Yes | No | Yes | 9.37 |
| Inventive Example 4 | Yes | Yes | Yes | 8.18 |

The results indicate improvements in the ESR of a part comprising conformal cathode on a fluted anode. Yet a further improvement is realized with the use of plated copper.

The invention has been described with reference to the preferred embodiments without limit thereto. One of skill in the art would realize additional embodiments and improvements which are not specifically set forth herein but which are within the scope of the invention as more specifically set forth in the claims appended hereto.

The invention claimed is:

1. A capacitor comprising:
    a fluted anode and an anode wire extending from said fluted anode;
    a dielectric on said fluted anode; and
    a layered conformal cathode directly on said dielectric and wherein said layered conformal cathode has an average thickness of no more than 40 microns and a deviation in thickness of no more than 50% of an average thickness.

2. The capacitor of claim 1 wherein said layered conformal cathode has an average thickness of no more than 20 microns.

3. The capacitor of claim 2 wherein said layered conformal cathode has an average thickness of no more than 10 microns.

4. The capacitor of claim 1 wherein said layered conformal cathode has a deviation in thickness of no more than 40% of an average thickness.

5. The capacitor of claim 4 wherein said layered conformal cathode has a deviation in thickness of no more than 30% of an average thickness.

6. The capacitor of claim 5 wherein said layered conformal cathode has a deviation in thickness of no more than 20% of an average thickness.

7. The capacitor of claim 6 wherein said layered conformal cathode has a deviation in thickness of no more than 10% of an average thickness.

8. The capacitor of claim 1 wherein said layered conformal cathode further comprises a first conductive layer.

9. The capacitor of claim 8 wherein said first conductive layer comprises a conductive layer selected from $MnO_2$ and a conductive polymer.

10. The capacitor of claim 9 wherein said conductive polymer is selected from the group consisting of polyaniline, polypyrol and polythiophene.

11. The capacitor of claim 10 wherein said conductive polymer comprises polydioxythiophene.

12. The capacitor of claim 1 wherein said anode comprises a valve metal or a conductive oxide of a valve metal.

13. The capacitor of claim 12 wherein said valve metal or a conductive oxide of a valve comprises a material selected from the group consisting of Al, W, Ta, Nb, NbO, Ti, Zr, and Hf.

14. The capacitor of claim 13 wherein said valve metal or a conductive oxide of a valve is selected from tantalum and niobium.

15. The capacitor of claim 1 wherein said flutes have a width of no more than 0.022 inches.

16. The capacitor of claim 15 wherein said flutes have a width of no more than 0.019 inches.

17. The capacitor of claim 16 wherein said flutes have a width of no more than 0.016 inches.

18. The capacitor of claim 17 wherein said flutes have a width of at least more than 0.004 inches.

19. The capacitor of claim 1 wherein said flutes have a ratio of depth to width of at least 0.60:1.

20. The capacitor of claim 1 further comprising a carbon containing layer on said layered conformal cathode.

21. The capacitor of claim 20 wherein said carbon containing layer has a thickness of at least 1 micron to no more than 20 microns.

22. The capacitor of claim 20 further comprising a metal layer on said carbon containing layer of said layered conformal cathode layer.

23. The capacitor of claim 22 wherein said metal layer is a plated metal layer on said carbon containing layer.

24. The capacitor of claim 23 wherein said metal layer has a thickness of at least 2 microns.

25. The capacitor of claim 1 wherein said layered conformal cathode is an electrochemically deposited conductive polymer.

26. The capacitor of claim 1 further comprising a metal layer on said layered conformal cathode layer.

27. The capacitor of claim 26 wherein a ratio of a surface area in said flutes of said metal layer at an adjacent cathode layer interface to said dielectric at a cathode layer interface is greater than 75%.

28. The capacitor of claim 27 wherein a ratio of a surface area in said flutes of said metal layer at an adjacent cathode layer interface to said dielectric at a cathode layer interface is greater than 85%.

29. The capacitor of claim 28 wherein a ratio of a surface area in said flutes of said metal layer at an adjacent cathode layer interface to dielectric at a cathode layer interface is greater than 95%.

30. The capacitor of claim 27 wherein said metal layer is a plated metal layer.

31. The capacitor of claim 26 wherein said metal layer is a plated metal layer on said layered conformal cathode layer.

32. The capacitor of claim 31 wherein said plated metal layer comprises a material selected from the group consisting of copper, silver, nickel and gold.

33. The capacitor of claim 32 wherein said plated metal layer comprises copper.

34. A capacitor comprising:
an anode and an anode wire extending from said anode wherein said anode comprises flutes;
a dielectric on said anode; and
a layered conformal cathode directly on said dielectric and wherein said layered conformal cathode has a deviation in thickness of no more than 50% of an average thickness.

35. The capacitor of claim 34 wherein said layered conformal cathode has a deviation in thickness of no more than 40% of an average thickness.

36. The capacitor of claim 35 wherein said layered conformal cathode has a deviation in thickness of no more than 30% of an average thickness.

37. The capacitor of claim 36 wherein said layered conformal cathode has a deviation in thickness of no more than 20% of an average thickness.

38. The capacitor of claim 37 wherein said layered conformal cathode has a deviation in thickness of no more than 10% of an average thickness.

39. The capacitor of claim 34 wherein said layered conformal cathode further comprises a first conductive layer.

40. The capacitor of claim 39 wherein said first conductive layer comprises a conductive layer selected from $MnO_2$ and a conductive polymer.

41. The capacitor of claim 40 wherein said conductive polymer is selected from the group consisting of polyaniline, polypyrol and polythiophene.

42. The capacitor of claim 41 wherein said conductive polymer comprises polydioxythiophene.

43. The capacitor of claim 34 wherein said anode comprises a valve metal or a conductive oxide of a valve metal.

44. The capacitor of claim 43 wherein said valve metal or a conductive oxide of a valve comprises a material selected from the group consisting of Al, W, Ta, Nb, NbO, Ti, Zr, and Hf.

45. The capacitor of claim 44 wherein said valve metal or a conductive oxide of a valve is selected from tantalum and niobium.

46. The capacitor of claim 34 wherein said flutes have a ratio of depth to width of at least 0.60:1.

47. The capacitor of claim 34 further comprising a carbon containing layer on said layered conformal cathode.

48. The capacitor of claim 47 wherein said carbon containing layer has a thickness of at least 1 micron to no more than 20 microns.

49. The capacitor of claim 47 further comprising a metal layer on said carbon containing layer.

50. The capacitor of claim 49 wherein said metal layer has a thickness of at least 2 microns.

51. The capacitor of claim 34 wherein said layered conformal cathode is an electrochemically deposited conductive polymer.

52. The capacitor of claim 34 further comprising a metal layer on said layered conformal coating.

53. The capacitor of claim 52 wherein said metal layer comprises a material selected from the group consisting of copper, silver, nickel and gold.

54. The capacitor of claim 53 wherein said metal layer comprises copper.

55. The capacitor of claim 52 wherein a ratio of a surface area in said flutes of said metal layer at an adjacent cathode layer interface to said dielectric at a cathode layer interface is greater than 75%.

56. The capacitor of claim 55 wherein said ratio of said surface area in said flutes of said metal layer at an adjacent cathode layer interface to said dielectric at a cathode layer interface is greater than 85%.

57. The capacitor of claim 56 wherein said ratio of said surface area in said flutes of said metal layer at an adjacent cathode layer interface to said dielectric at a cathode layer interface is greater than 95%.

58. The capacitor of claim 52 wherein said metal layer is a plated metal layer.

\* \* \* \* \*